US011870196B2

(12) United States Patent
LeFavour et al.

(10) Patent No.: US 11,870,196 B2
(45) Date of Patent: Jan. 9, 2024

(54) BATTERY POWERED PORTABLE CRIMP TOOL WITH C-HEAD

(71) Applicant: Hubbell Incorporated, Shelton, CT (US)

(72) Inventors: John David LeFavour, Litchfield, NH (US); Katherine W. Stokes, Westfield, MA (US)

(73) Assignee: Hubbell Incorporated, Shelton, CT (US)

( * ) Notice: Subject to any disclaimer, the term of this patent is extended or adjusted under 35 U.S.C. 154(b) by 1191 days.

(21) Appl. No.: 16/520,737

(22) Filed: Jul. 24, 2019

(65) Prior Publication Data

US 2020/0036150 A1 Jan. 30, 2020

Related U.S. Application Data

(60) Provisional application No. 62/703,480, filed on Jul. 26, 2018.

(51) Int. Cl.

| | |
|---|---|
| ***H01R 43/042*** | (2006.01) |
| ***H01R 43/058*** | (2006.01) |
| ***B21D 37/10*** | (2006.01) |
| ***B25B 27/02*** | (2006.01) |
| ***B25B 27/14*** | (2006.01) |
| ***H01R 43/048*** | (2006.01) |

(52) U.S. Cl.

CPC ......... *H01R 43/0428* (2013.01); *B21D 37/10* (2013.01); *B25B 27/02* (2013.01); *B25B 27/146* (2013.01); *H01R 43/048* (2013.01); *H01R 43/058* (2013.01)

(58) Field of Classification Search

CPC ...... B21D 37/10; B21D 39/025; B21D 53/36; B25B 27/02; B25B 27/146; H01R 43/0428; H01R 43/048; H01R 43/058

See application file for complete search history.

(56) References Cited

U.S. PATENT DOCUMENTS

| | | | | |
|---|---|---|---|---|
| 7,882,722 | B2 | 2/2011 | LaFavour et al. | |
| 9,993,885 | B2 | 6/2018 | Frenken | |
| 10,084,277 | B2 | 9/2018 | Wason et al. | |
| 2017/0302044 | A1 * | 10/2017 | LeFavour | B25B 27/146 |
| 2020/0036150 | A1 * | 1/2020 | LeFavour | B25B 27/146 |

OTHER PUBLICATIONS

Greenlee Textron Inc, Micro Crimping Tool, catalog, pp. 1-4, Jun. 2014.

Klauke GmbH, Klauke Micro—The First Electromechanical Crimping Tpol with PowerSense Technology, catalog, pp. 1-6, Jun. 2014.

Greenlee Textron Inc, Battery-powered Crimping Tool, Instruction Manual, pp. 1-16, Mar. 2015.

* cited by examiner

*Primary Examiner* — Minh N Trinh

(74) *Attorney, Agent, or Firm* — Wissing Miller LLP

(57) ABSTRACT

The present disclosure provides a mini or micro hand-held, portable, battery-powered 2-3 ton crimp tool capable of crimping conductors ranging between #22 AWG and #2 AWG to a termination. The crimp tool has a C-shaped head portion that uses linear motion to perform the crimp operation.

20 Claims, 13 Drawing Sheets

BATTERY POWERED PORTABLE CRIMP TOOL WITH C-HEAD

CROSS-REFERENCE TO RELATED APPLICATIONS

The present disclosure is based on and claims benefit from U.S. Provisional Patent Application Ser. No. 62/703,480 filed on Jul. 26, 2018 entitled "Battery Powered Portable Crimp Tool With C-Head" the contents of which are incorporated herein in their entirety by reference.

BACKGROUND

Field

The present disclosure relates generally to portable crimp tools, and more particularly, to battery powered portable crimp tools having a C-shaped head for crimping conductors, cables and/or wires to a termination.

Description of the Related Art

Battery powered crimp tools with scissor type jaws are known in the art. These tools have jaws that use a scissor action to cause dies to be pressed together to crimp a wire to a lug. More specifically, these tools have a pivot point about which two dies are rotated toward each other to crimp a wire to a lug.

SUMMARY

The present disclosure provides exemplary embodiments of portable crimp tools that utilize linear motion to crimp conductors to terminations. For example, the crimp tool may be a portable, hand held crimp tool having an in-line handle portion and a head portion. The crimp tool has a frame extending between the handle portion and the head portion. The head portion has a working area where a crimping operation is performed, and the handle portion houses a drive system that drives the crimping operation. Generally, the drive system includes an electric motor, a gear reduction assembly, a ram drive assembly and a linkage assembly. The electric motor and gear reduction assembly drive the ram drive assembly. The linkage assembly is operatively coupled to the ram drive assembly and a ram. The ram causes the crimping operation.

In an exemplary embodiment, the drive system includes electric motor, a gear reduction assembly, a ram drive assembly and a linkage assembly. The electric motor is adapted to be powered by a battery, such as a 12 VDC, 14 VDC, 16 VDC, 18 VDC, 20 VDC or 24 VDC battery. The gear reduction assembly is used to reduce the output speed of a shaft of the electric motor by a factor in the range of about 30 percent and about 50 percent. The ram drive system has a drive arm operatively coupled to the gear reduction assembly, a wedge support having a bore that receives at least a portion of the drive arm such that rotation of the drive arm causes linear movement of the wedge support. The ram drive system also includes a wedge that is secured to, integral with or monolithically formed into the wedge support. The wedge has a drive surface, e.g., a camming surface. The linkage assembly includes a first link pair, a second link pair and a roller. Each link in the first link pair has first and second mounting holes, and each link in the second link pair has third and fourth mounting holes for coupling the link pairs together. The roller has a center bore and is positioned between the first and second link pairs. More specifically, the second link pair is coupled to the first link pair by positioning a pivot pin within the second mounting holes of the first link pair and the third mounting holes of the second link pair, and the roller is positioned between the first and second link pairs by positioning the pivot pin through the center bore. The roller is positioned between the first and second link pairs so that the roller is aligned with and in contact with the drive surface, e.g., the camming surface, of the wedge. By aligning the roller so that it is in contact with the drive surface, e.g., the camming surface, of the wedge, linear motion of the wedge support causes the linkage assembly to move between a retracted position and an extended position. A ram can then be attached to the drive system so that as the linkage assembly moves between the retracted and extended positions, the ram moves between open and crimping positions.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The present disclosure provides embodiments of hand-held, portable, battery-powered 2-3 ton crimp tool capable of crimping conductors ranging between #22 AWG and #2

AWG to a termination. The crimp tool has a C-shaped head portion that relies on linear motion to perform the crimp operation.

The present disclosure will be shown and described in connection with hand-held, portable, battery-powered, in-line crimp tools. However, the hand-held, portable, battery-powered, crimp tool may be a pistol grip or other type grip hand-held, portable, battery-powered, crimp tools. For ease of description, the hand-held, portable, battery-powered, crimp tools according to the present disclosure may also be referred to as the "tools" in the plural and the "tool" in the singular. The conductors, cables, wires or other objects to be crimped to a termination by the tool of the present disclosure may also be referred to collectively as the "conductors" in the plural and the "conductor" in the singular. The terminations include all types of crimp terminations, such as lugs, contacts, splices, butt splices, male quick disconnect terminals, and female quick disconnect terminals, etc.

Figure 3:
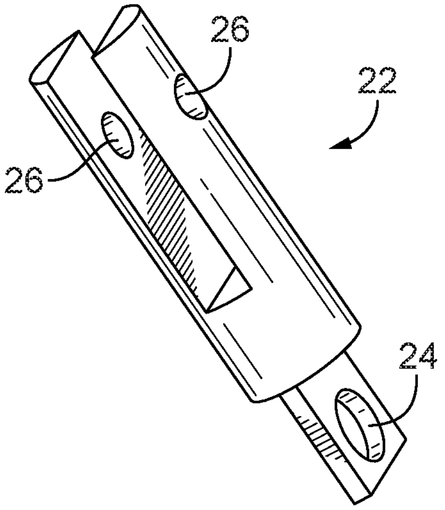
FIG. 3 is a perspective view of an exemplary embodiment of a ram included in the tool of FIG. 1.
Figure 4:
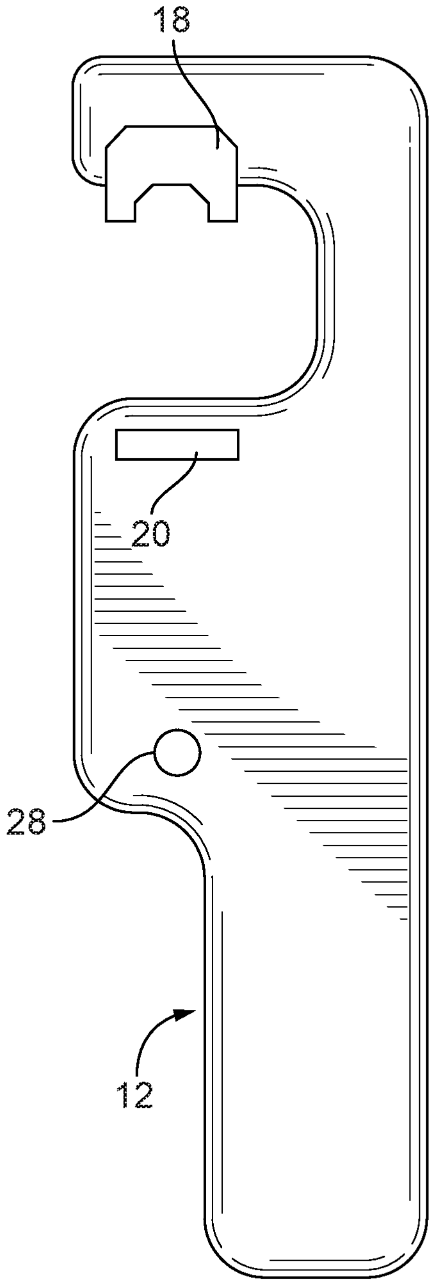
FIG. 4 is a side elevation view of the frame of the crimping tool of FIG. 1 opposite the view from FIG. 2.
Figure 10:
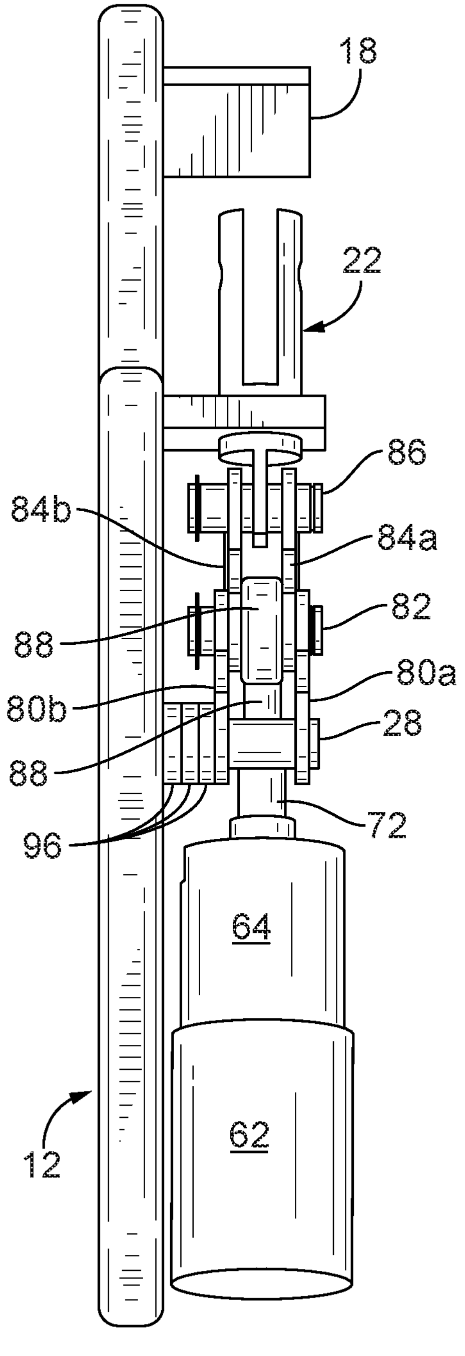
FIG. 10 is another side elevation view of the crimping tool of FIG. 7.
Figure 11:
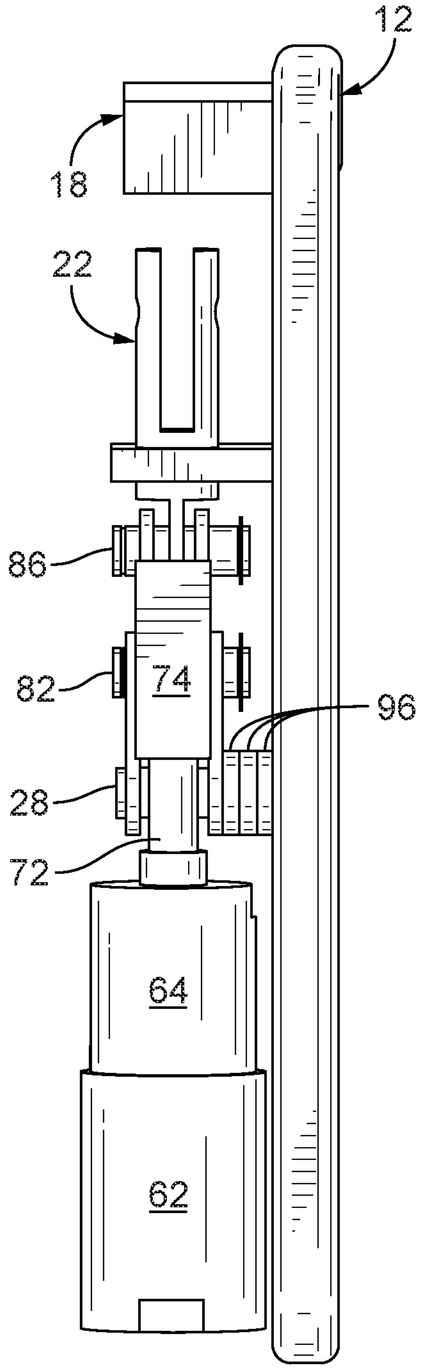
FIG. 11 is another side elevation view of the crimping tool of FIG. 7 opposite the view from FIG. 10.

Referring to FIGS. 1-6, exemplary embodiments of a hand-held, portable, battery-powered, in-line crimp tool 10 are shown. The tool 10 includes frame 12 spanning a head portion 14 and a handle portion 40. The frame 12 forms a working area 16 in the head portion 14 and supports components within the handle portion 40. The portion of the frame 12 in the working area 16 forms a C-shaped structure that may include a nest 18, seen in FIGS. 4, 10 and 11, or other structure, e.g., a die, that can be secured to, integral with, monolithically formed into or removably attached to the frame 12. The nest or dies are configured to crimp a conductor (not shown) to a termination (not shown). The frame 12 includes a ram mounting bracket 20, seen in FIG. 4, that can be secured to, integral with or monolithically formed into the frame 12. A ram 22, seen in FIG. 3, passes from the working area 16 through the ram mounting bracket 20 into the handle portion 40. As seen in FIG. 3, one end of the ram 22 includes a bore 24 used to connect the ram 22 to a linkage assembly 68 which is described below. An impactor or die (not shown) can be removably attached to mounting holes 26 near an end of the ram 22 opposite the bore 24, which is used to crimp the conductor to the termination. The frame 12 also include a pin 28, seen in FIG. 4, that can be secured to, integral with or monolithically formed into the frame 12. The pin 28 is used to attach the linkage assembly 68 to the frame 12 as described below. It is noted that the head portion 14 and handle portion 40 are provided for general reference and to orient the reader to a general location on the tool 10.

Figure 1:
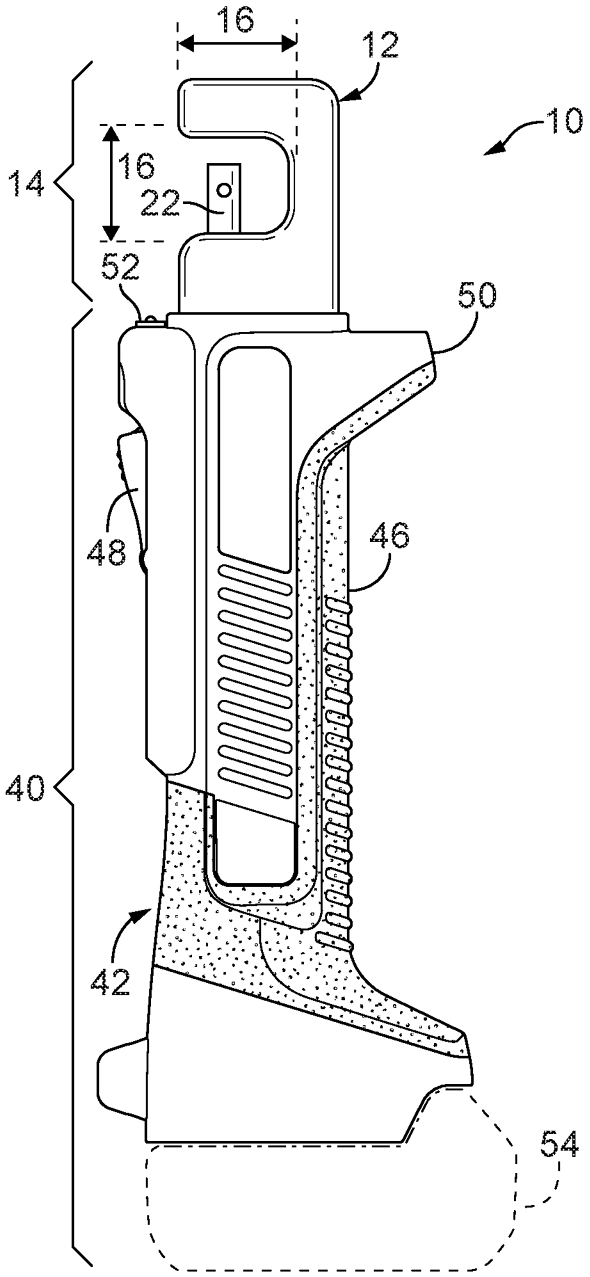
FIG. 1 is a side elevation view of an exemplary embodiment of a crimp tool according to the present disclosure, illustrating a handle portion and a working head portion.
Figure 2:
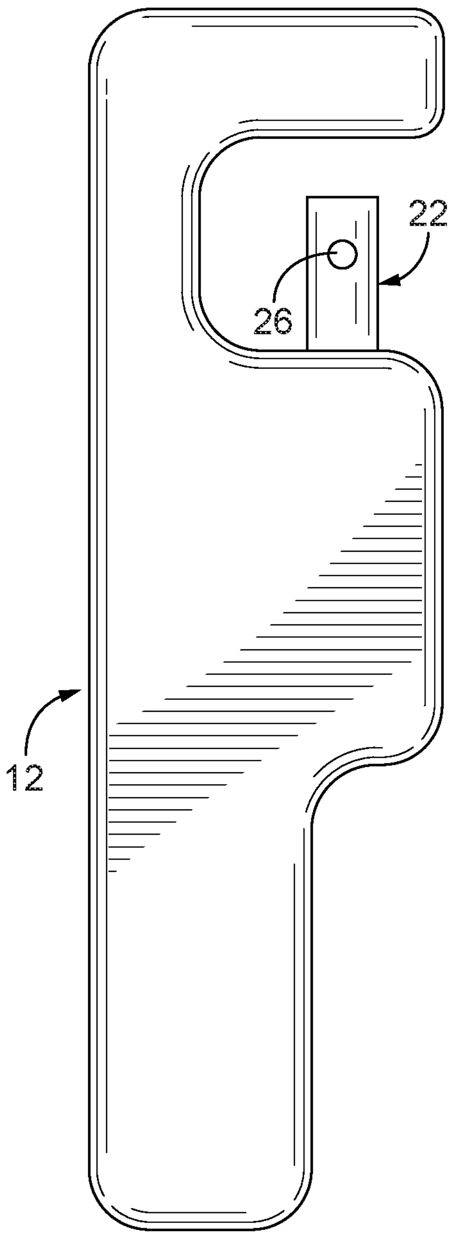
FIG. 2 is a side elevation view of an exemplary embodiment of a frame of the crimping tool of FIG. 1.
Figure 5:
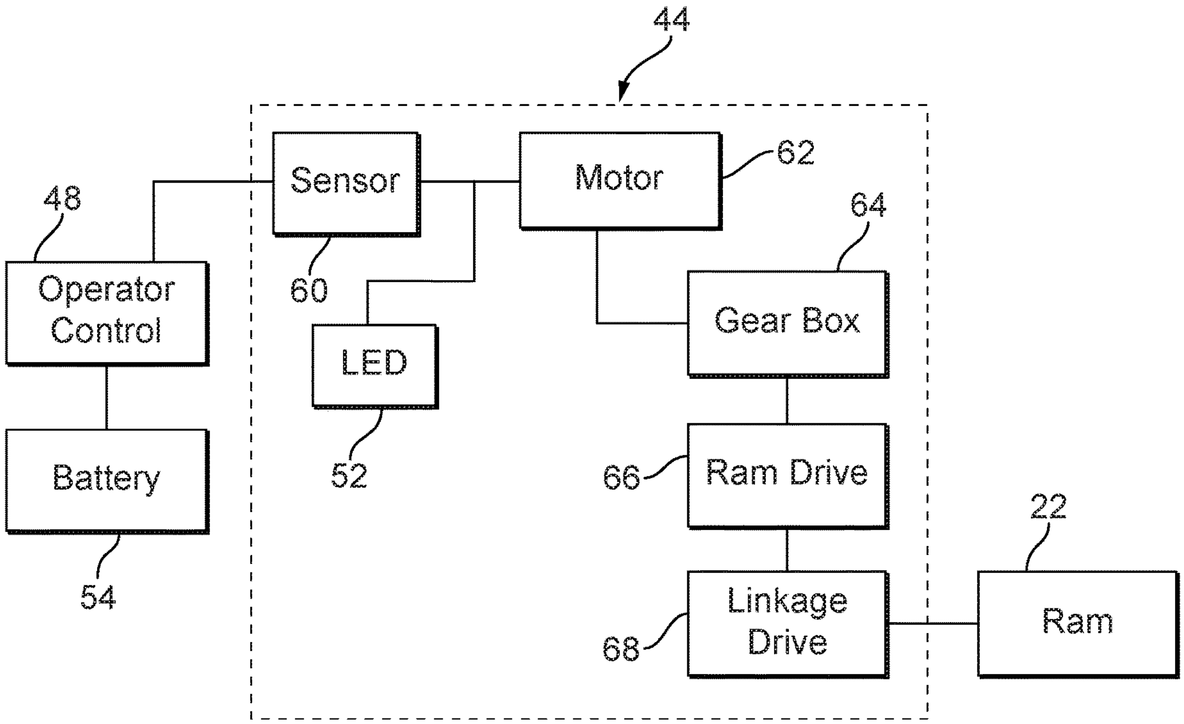
FIG. 5 is a block diagram representation of the crimp tool of FIG. 1.
Figure 6:
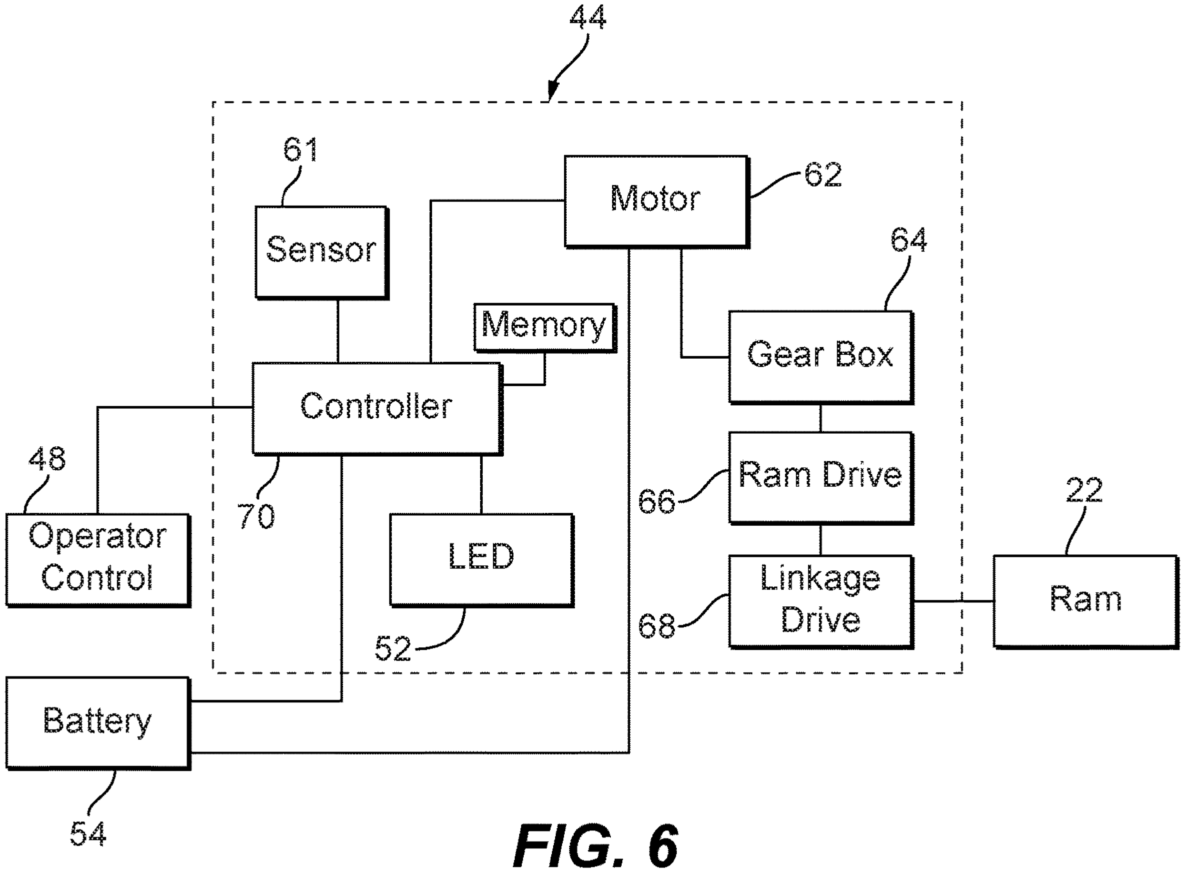
FIG. 6 is a block diagram representation of another exemplary embodiment of the crimp tool of FIG. 1.
Figure 7:
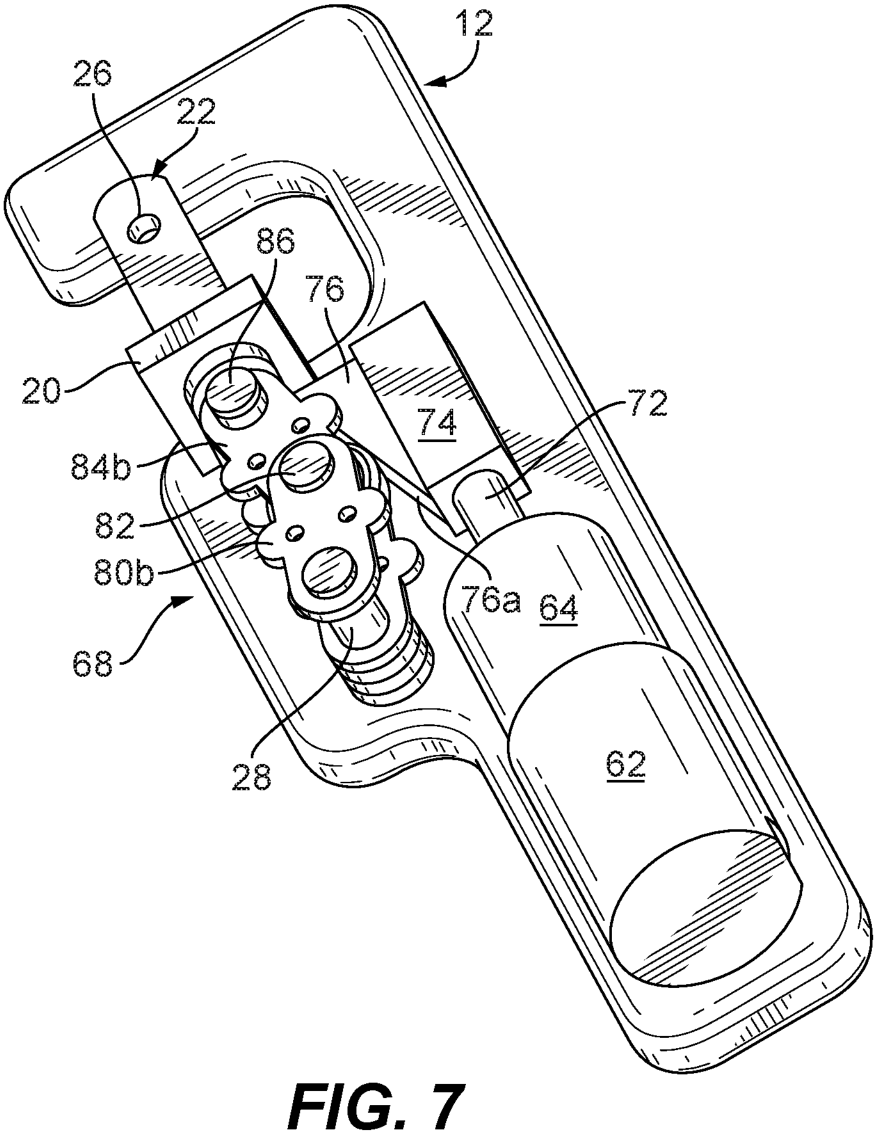
FIG. 7 is a side perspective view of the crimping tool of FIG. 1 with a housing covering the handle portion removed.
Figure 8:
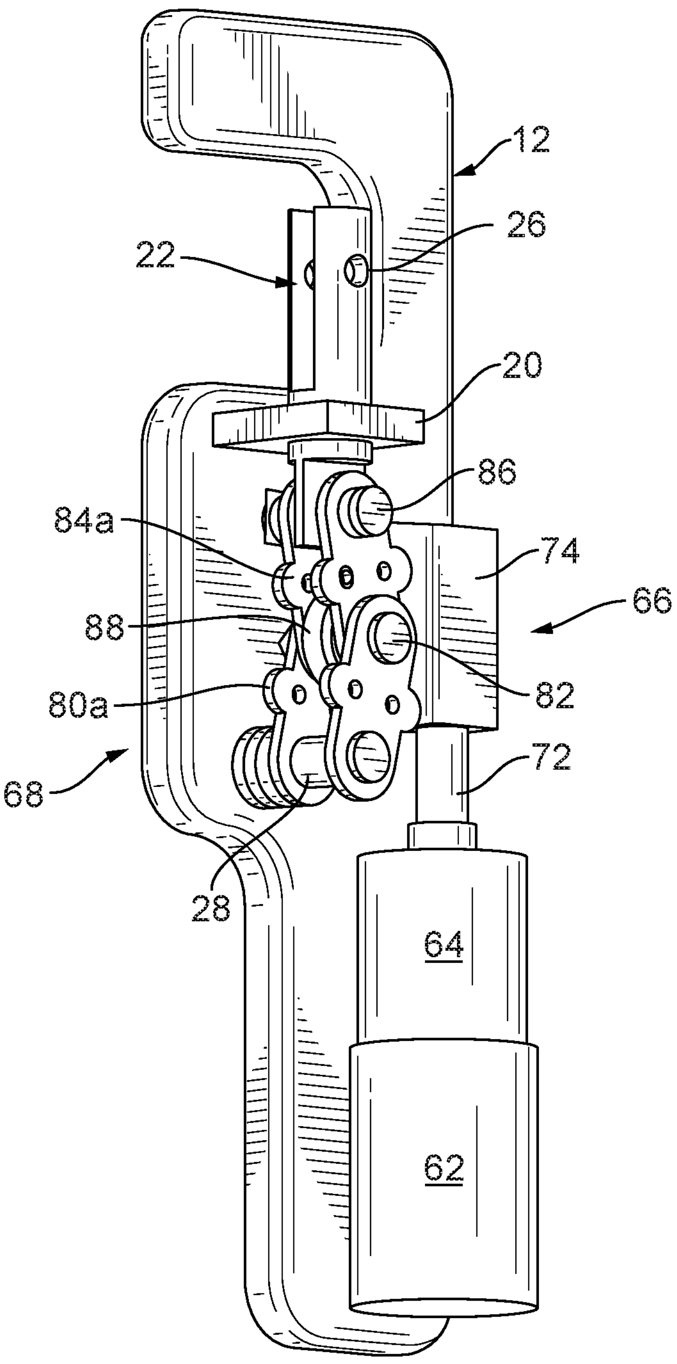
FIG. 8 is another side perspective view of the crimping tool of FIG. 7.
Figure 9:
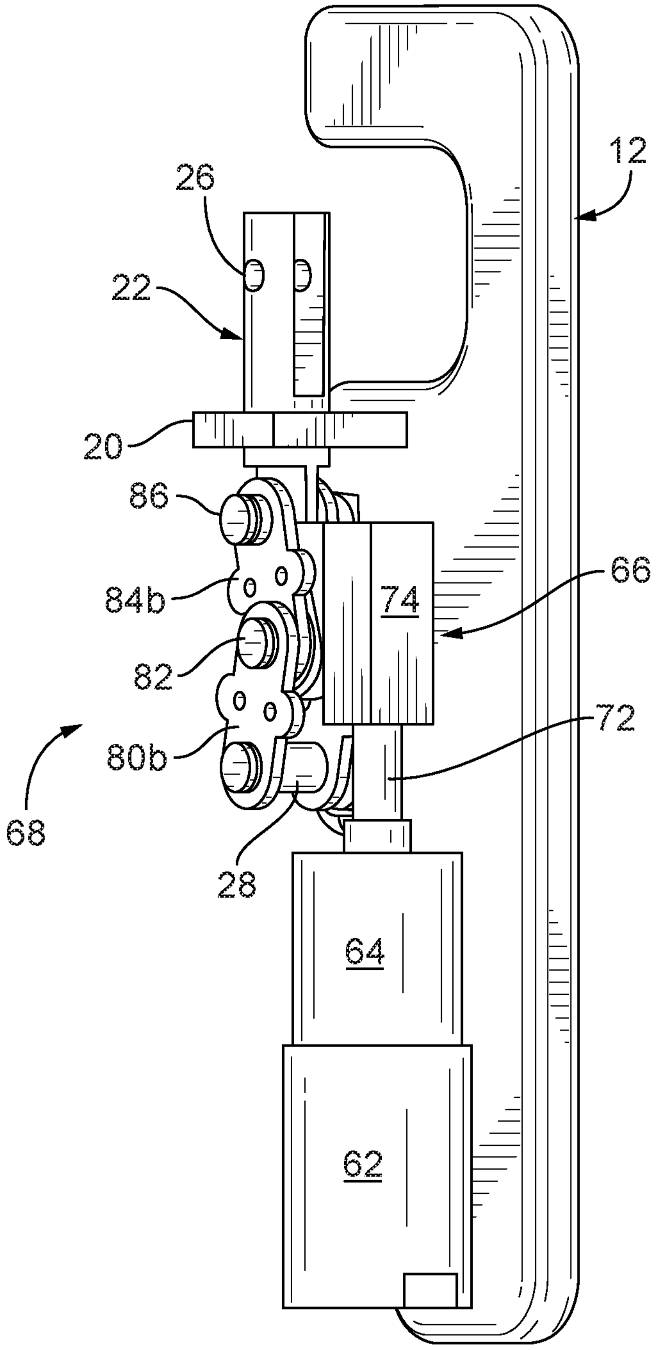
FIG. 9 is another side perspective view of the crimping tool of FIG. 7.

Continuing to refer to FIGS. 1 and 5, the handle portion 40 includes a tool handle or housing 42 encasing a portion of the frame 12 and a drive system 44. In the exemplary embodiment shown, the housing 42 is an in-line type housing with includes a hand grip portion 46. However, the housing 42 could be in any suitable type of housing, such as, for example, a pistol grip type housing. The hand grip portion 46 of the housing 42 includes one or more operator controls 48, such as the trigger switch shown, which is used to activate the drive system 44, as described below. A hand guard or hilt 50 may be provided at the end of the hand grip portion 46 of the housing 42 closest to the head portion 14. The hilt 50 can limit or prevent an operator's hand from slipping toward the head portion 14 while operating the tool 10. The hilt 50 may include a light 52, e.g., an LED, that is operatively connected to the drive system 44 such that when the switch 48 is actuated the light 52 activates to illuminate the working area 16 of the head portion 14. In an embodiment where there is no hilt or the working area 16 of the head portion 14 faces the user, the light 52 may be positioned at an end of the hand grip portion 46 closest to the head portion 14 as seen in FIG. 1.

A battery 54, e.g., a 12V, 14V, 16V, 18V, 20V or 24V battery, can be removably connected to one end of the housing 42, which in an in-line type housing is typically the end of the housing away from the head portion 14. In another embodiment, the battery 54 could be removably mounted or connected to any suitable position on the housing 42. In another embodiment, the battery 54 may be affixed to the tool 10 so that it is not removable. The battery 54 shown is a rechargeable battery, such as a lithium ion battery, that can output a voltage of at least 12 VDC, and preferably in the range of between about 12 VDC and about 24 VDC.

Referring to FIGS. 5 and 7-14, an exemplary embodiment of the drive system 44 will be described. In this embodiment, the drive system 44 includes a sensor module 60, an electric motor 62, a gear reduction assembly or gearbox 64, a ram drive assembly 66, and a linkage assembly 68. An input to the sensor module 60 is electrically connected to the operator control 48, which is connected to the battery 54. An output of the sensor module 60 is electrically connected to the motor 62 and the light 52 if a light is included in the tool 10. The sensor module 60 may be a current sensor that can sense the peak load, e.g., 10 amps, on the motor 62 and turn the motor off when the peak load is reached. In another exemplary embodiment, the sensor module 60 may be a load cell sensor that can measure the force applied by the tool during a crimping cycle, and that can shut off the supply of battery power to the motor 62 (and light 52) when the sensed force exceeds a predetermined threshold, e.g., between about 85 N and about 90 N. For example, the sensor module 60 can measure the force applied by a die (not shown) attached to the ram 22 during a crimping operation. In this configuration, when the operator control 48 is manually activated, power from the battery 54 activates and drives the motor 62. The motor 62 can be a brush or brushless motor or other motor that can run off a 12V, 14V, 16V, 18V, 20V or 24V battery. An example of a suitable motor is a RS550VC motor manufactured by Mabuchi Motor Co. Limited. Generally, the motor 62 is adapted to operate at a nominal voltage corresponding to the voltage of the battery 54, e.g., between about 12 VDC and about 24 VDC. For example, if the battery 54 is adapted to output a voltage of about 18 VDC, then the motor 62 would be adapted to operate at a voltage of about 18 VDC. Under a no-load condition, such a motor 62 can operate at about 22,000 rpm with a current of about 2 amps. At maximum efficiency, the motor 62 can operate at about 20,000 rpm with a current of about 10 amps, a torque of about 65 mN-m, and an output of about 125 watts. An example of such a 12 VDC motor 62 is the RS550VC motor, manufactured by Mabuchi Motor Co. Limited. However, as noted above, any suitable type of motor adapted to operate at or above a 12 VDC nominal voltage could be used. A shaft of the motor 62 is connected to a gear reduction assembly or gearbox 64, shown in block form in FIG. 5 and in FIG. 12. The gear reduction assembly 64 is used to reduce or translate the high-speed rotation of the shaft of the motor 62 by a predefined percentage to drive the ram drive assembly 66 between open and crimping positions as described below. In a non-limiting example, the predefined percentage may be about a 54 percent reduction. Any suitable type of gear reduction assembly 64 could be used to reduce the high-speed rotation of the shaft of the motor 62 to a desired rotations per minute. In a non-limiting example of the rotations per minute of the output of the gear reduction assembly 64 may be about 407 rpm. A non-limiting example of a gear reduction assembly 64 is the GP22C manufactured by Maxon Motor.

Referring now to FIGS. 6-14, another exemplary embodiment of the drive system 44 will be described. The drive system 44 includes a sensor module 61, an electric motor 62, a gear reduction assembly 64, a ram drive assembly 66, a linkage assembly 68 and a controller 70. In this embodiment, the sensor module 61, motor 62, operator control 48 and light 52, e.g., an LED, are electrically connected to the controller 70 which controls the operation sensor module 61, the motor 62 and the light 52. The sensor module 61 can measure the force applied by the tool during a crimping operation. The controller 70 monitors the sensor module 61 and deactivates the motor 62 (and light 52) for a predetermined period of time when the sensed force exceeds a predetermined threshold, e.g., 89 N. In one embodiment, the predetermined period of time can be between about 2 seconds and about 3 seconds. However, any suitable predetermined period of time could be set. In another embodiment, the controller 70 could be adapted to deactivate the motor 62 until a reset button (not shown) is activated or reset like procedure is performed by the operator. In this configuration, when the operator control 48 is manually activated, the controller 70 enables or activates the motor 62 and power from the battery 54 drives the motor 62. The motor 62 is described above and for ease of description is not repeated. The shaft of the motor 62 is connected to the gear reduction assembly 64, shown in block form in FIG. 6 and in FIG. 12. The gear reduction assembly 64 is described above and for ease of description is not repeated.

Figure 12:
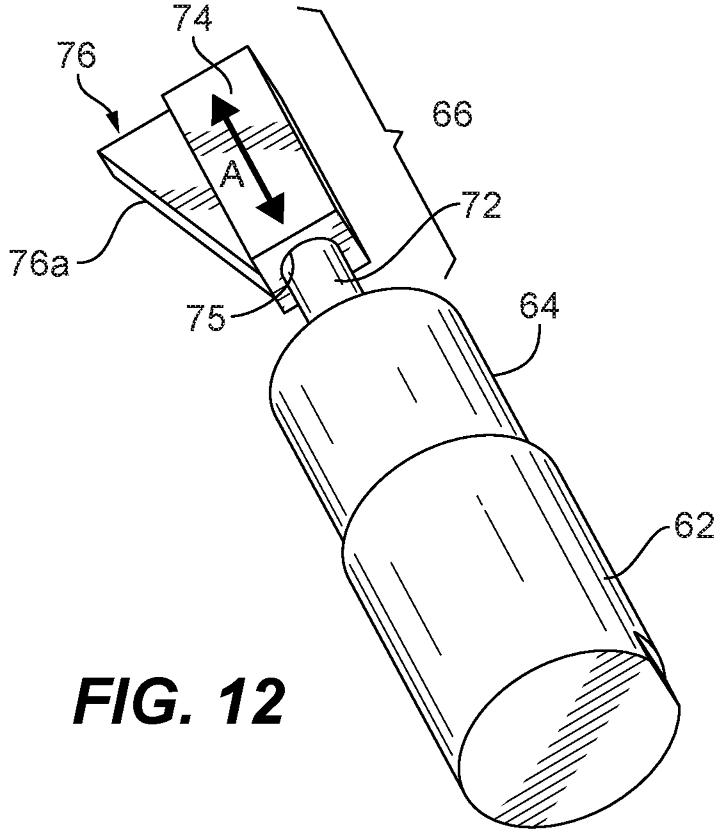
FIG. 12 is a perspective view of an exemplary embodiment of a drive assembly within the housing of the handle portion of the crimp tool of FIG. 1.

Referring now to FIG. 12, the ram drive assembly 66 according to the present disclosure is shown. The ram drive assembly 66 includes a drive arm 72, a wedge support 74 and a wedge 76. The ram drive assembly 66 is provided to move the linkage assembly 68 between a retracted position, seen in FIG. 15 (step 1) and an extended position, seen in FIG. 15 (step 3). In the exemplary embodiment shown, the drive arm 72 and wedge support 74 configuration form a ball screw that translates rotational motion of the drive arm 72, via the gearbox 64, to linear motion of the wedge support 74. More specifically, the drive arm 72, in this exemplary embodiment, is a threaded shaft that is received within a bore 75 having ball bearings within the wedge support 74 that act as a nut. As the drive arm 72 rotates via the gearbox 64, the wedge support 74 moves linearly in the direction along arrow "A" which in this exemplary embodiment is toward and away from the gearbox 64. Thus, the wedge support 74 acts as the nut while the threaded shaft 72 acts as the screw in the ball screw configuration. In another exemplary embodiment, the drive arm 72 and wedge support 74 configuration can form a leadscrew that translates rotational motion of the drive arm 72, via the gearbox 64, to linear motion of the wedge support 74 with minimal friction. More specifically, the drive arm 72, in this exemplary embodiment, is a threaded shaft that is received within a threaded bore 75 in the wedge support 74 that acts as a nut. As the drive arm 72 rotates, via the gearbox 64, the wedge support 74 moves linearly in the direction of arrow "A" which in this exemplary embodiment is toward and away from the gearbox 64. Thus, the wedge support 74 acts as the nut while the drive arm 72 acts as the screw in the leadscrew configuration. It is noted however, that the present disclosure contemplates other known mechanisms that can be used to translate rotational movement of the motor 62 through the gear box 64 to linear movement sufficient to drive the ram 22. As the wedge support 74 moves linearly, the wedge 76, which is secured to, integral with or monolithically formed into the wedge support 74, moves linearly. The wedge 76 has a drive surface **76*a*, which is, for example, an inclined surface or a camming surface, that causes the linkage assembly 68** to move between the retracted position and the extended position, as will be described below.

Figure 13:
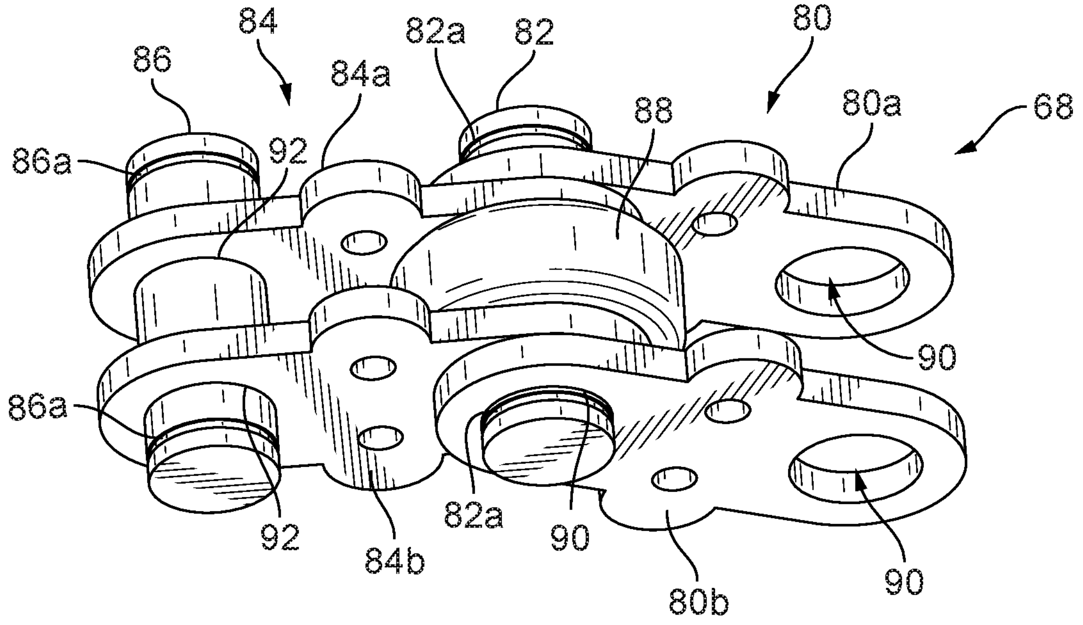
FIG. 13 is a perspective view of an exemplary embodiment of a linkage assembly within the housing of the handle portion of the crimp tool of FIG. 1.
Figure 14:
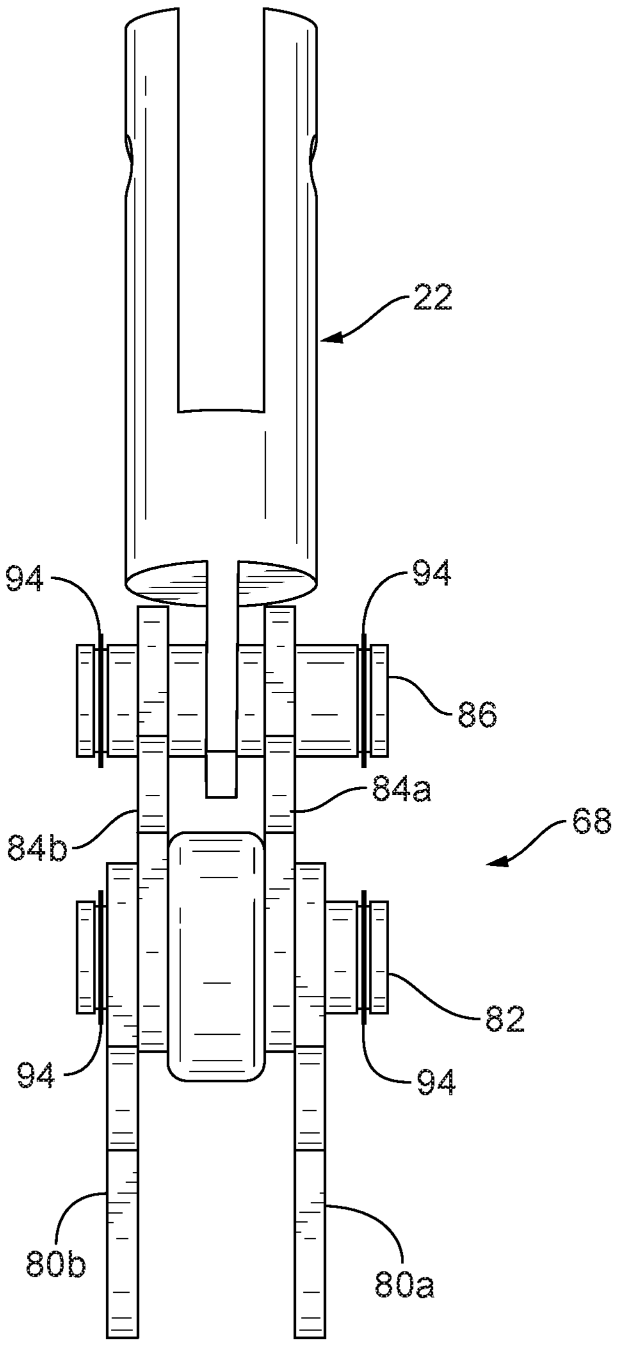
FIG. 14 is a side elevation view of the linkage assembly of FIG. 13 with the ram attached to the linkage assembly.

Referring to FIGS. 13 and 14, the linkage assembly 68 includes a first pair of links 80 joined together by pin 82, and a second pair of links 84 joined together by pin 82 and pin 86, and a cam engaging surface, e.g., a roller 88. The first link pair 80 includes link **80*a* and link 80*b* each having a bore 90 at each end of the link. The second link pair 84 includes link 84*a* and 84*b* each having a bore 92 at each end of the link. To assemble the linkage assembly 68, link 80*a* is aligned with link 84*a* so that a bore 90 in link 80*a* aligns with a bore 92 in link 84*a*. Similarly, link 80*b* is aligned with link 84*b* so that a bore 90 in link 80*b* aligns with a bore 92 in link 84*b*. In this exemplary embodiment, the cam engaging surface 88 is a roller. The roller 88 is positioned between link 84*a* and link 84*b* so that a center bore in the roller 88 is aligned with the bores 92 in the links 84*a* and 84*b*, as seen in FIG. 13. A pin 82 is inserted through bore 90 in link 80*a*, bore 92 in link 84*a*, the bore in the center of roller 88, the bore 92 in link 84*b* and through bore 90 in link 80*b* to join the link pairs 80 and 84 around a central pivot point which is pin 82. Clips 94, e.g., C-clips or E-clips, are attached to, e.g., snapped onto, grooves 82*a* in pin 82 to prevent the link pair 80 and the link pair 84 from sliding off the pin 82**.

To attach the linkage assembly 68 to the ram 22, the ram is positioned between the link **84*a* and link 84*b* so that the bore 24 in the ram 22 is aligned with the bores 92 in the link 84*a* and link 84*b*, as seen in FIG. 14. The Pin 86 is inserted through bore 92 in link 84*a*, through the bore 24 in the ram 22 and through bore 92 in link 84*b* to interconnect the links 84*a* and 84*b* and to connect the ram 22 to the linkage assembly 68. Clips 94, e.g., C-clips or E-clips, are attached to, e.g., snapped onto, grooves 86*a* in pin 86 to prevent the link pair 84 and the ram 22 from sliding off the pin 86**.

In this exemplary embodiment, the linkage assembly 68 is secured to the frame 12 via pin 28. More specifically, the bore 90 in the link **80*b* is inserted onto the pin 28 and then the bore 90 in link 80*a* is inserted onto the pin 28. Clips, e.g., C-clips or E-clips, are attached to, e.g., snapped onto, grooves in the pin 28 to prevent the link pair 80 from sliding off the pin 28. It is noted that one or more spacers 96, seen in FIG. 10, may be positioned on the pins 28, 82 and 86 to align the linkage assembly 68 to the frame 12 and the ram 22 to the nest 18 or impacting zone within the working area 16 of the head portion 14**.

Figure 15:
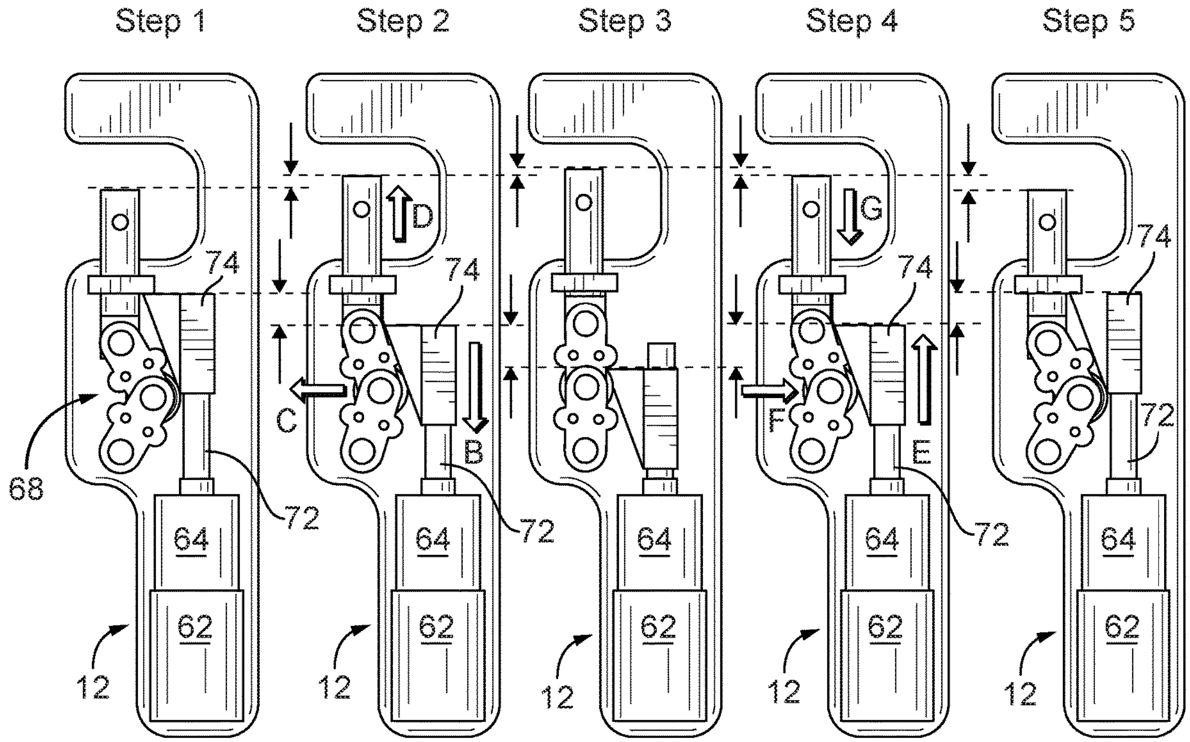
FIG. 15 is a sequence of side elevation views of the crimp tool of FIG. 7 illustrating movement of the linkage assembly and ram of the crimp tool.

Turning now to FIG. 15, the operation of the drive system 44 will be described. Initially, the ram 22 is in an open position, where the wedge support 74 is fully extended along the drive arm 72 so that the roller 88 of the linkage assembly 68 is at the bottom of drive surface **76*a* of wedge 76 (step 1). In this position, the linkage assembly 68 is in the retracted position. The drive system 44 is then activated, via for example operator control 48, seen in FIGS. 1, 5 and 6, such that the wedge support 74 and the wedge 76 move in the direction of arrow "B" which in this exemplary embodiment is away from the head portion 14 of the tool 10. With the wedge 76 moving in the direction of arrow "B" the roller 88 moves or rolls along the drive surface 76*a* of the wedge 76 causing the link pairs 80 and 84 to move in the direction of arrow "C." Movement of the link pairs in the direction of arrow "C" causes the ram 22 to move in the direction of arrow "D" which is toward the crimping position (step 2). When the roller 88 reaches the end of the drive surface 76*a*, the link pairs 80 and 84 have reached full extension such that the ram 22 is in the crimping position (step 3). When the ram 22 is in the crimping position, the linkage assembly 68 is in the extended position. To return the ram 22 to the open position, the motor 62 is reversed so that the wedge support 74 and wedge 76 move in the direction of arrow "E." With the wedge 76 moving in the direction of arrow "E" the roller 88 moves or rolls along the drive surface 76***a* of the wedge 76 in the opposite direction causing the link pairs 80 and 84 to move in the direction of arrow "F." Movement of the link pairs in the direction of arrow "F" causes the ram 22 to move in the direction of arrow "G" which is toward the open position (step 4). When the wedge support 74 is fully extended along the drive arm 72 so that the roller 88 of the linkage assembly 68 is at the bottom of drive surface 76*a* of wedge 76, the ram 22 is in the open position (step 5). In this position, the linkage assembly 68 is again in the retracted position.

The foregoing embodiments and advantages are merely exemplary and are not to be construed as limiting the scope of the present invention. The description of an exemplary embodiment of the present invention is intended to be illustrative, and not to limit the scope of the present invention. Various modification, alternatives and variations will be apparent to those of ordinary skill in the art, and are intended to fall within the scope of the invention.

What is claimed is:

1. A hand-held, battery-powered in-line crimp tool comprising:

a frame having a working head portion and a handle portion, the working head portion having a C-shaped structure, and the handle portion including a drive system that translates rotational movement of an electric motor to linear movement of a ram extending at least partially onto the working head portion, the drive system including:

the electric motor adapted to be powered by a battery;

a gear reduction assembly used to reduce the output speed of a shaft of the electric motor by a predetermined factor;

a ram drive system having a drive arm operatively coupled to the gear reduction assembly, and a drive surface operatively coupled to the drive arm such that rotation of the drive arm causes linear movement of the drive surface; and a linkage assembly operatively associated with the drive surface, such that when the shaft of the electric motor rotates in one direction the drive surface causes the linkage assembly to move from a retracted position to an extended position and when the shaft of the electric motor rotates in an opposite direction of the one direction the drive surface causes the linkage assembly to move from the extended position to the retracted position.

2. The hand-held battery-powered in-line crimp tool according to claim 1, further comprising the ram operatively coupled to the linkage assembly such that when the linkage assembly moves from the retracted position to the extended position the ram moves linearly from an open position to a crimping position, and when the linkage assembly moves from the extended position to the retracted position the ram moves linearly from the crimping position to the open position.

3. The hand-held battery-powered in-line crimp tool according to claim 2, wherein the ram comprises at least one coupling bore at one end used to operatively coupled the ram to the linkage assembly, and at least one mounting bore at an opposite end of the ram used when coupling the ram to an impactor or die.

4. The hand-held battery-powered in-line crimp tool according to claim 1, wherein the ram drive system further comprises a wedge integral to or monolithically formed into a wedge support, wherein the drive surface forms a portion of the wedge and the wedge support is attached to the drive arm.

5. The hand-held battery-powered in-line crimp tool according to claim 1, wherein the drive surface comprises a camming surface.

6. A hand-held battery-powered in-line crimp tool comprising:

a frame having a working head portion and a handle portion, the working head portion having a C-shaped structure, and the handle portion including a drive system that translates rotational movement of an electric motor to linear movement of a ram extending at least partially onto the working head portion, the drive system including:

the electric motor adapted to be powered by a battery;

a gear reduction assembly used to reduce the output speed of a shaft of the electric motor by a predetermined factor;

a ram drive system having a drive arm operatively coupled to the gear reduction assembly, a wedge support having a bore that receives at least a portion of the drive arm such that rotation of the drive arm causes linear movement of the wedge support, and a wedge having a drive surface; and a linkage assembly comprising:

a first link pair with each link in the link pair having first and second mounting holes;

a second link pair with each link in the link pair having third and fourth mounting holes; and a roller having a center bore positioned between the first and second link pairs;

wherein the second link pair is coupled to the first link pair by positioning a pivot pin within the second mounting holes of the first link pair and the third mounting holes of the second link pair, and wherein the roller is positioned between the first and second link pairs by positioning the pivot pin through the center bore of the roller; and wherein the roller is aligned with the drive surface of the wedge such that linear motion of the wedge support causes the linkage assembly to move between a retracted position and an extended position.

7. The hand-held battery-powered in-line crimp tool according to claim 6, further comprising the ram operatively coupled to the linkage assembly such that when the linkage assembly moves from the retracted position to the extended position the ram moves linearly from an open position to a crimping position, and when the linkage assembly moves from the extended position to the retracted position the ram moves linearly from the crimping position to the open position.

8. The hand-held battery-powered in-line crimp tool according to claim 7, wherein the ram comprises at least one coupling bore at one end used to operatively coupled the ram to the linkage assembly, and at least one mounting bore at an opposite end of the ram used when coupling the ram to an impactor or die.

9. The hand-held battery-powered in-line crimp tool according to claim 6, wherein the drive surface comprises a camming surface.

10. A hand-held battery-powered in-line crimp tool comprising:

a frame having a working head portion and a handle portion; and a drive system positioned at least partially within the handle portion of the frame, the drive system including:

an electric motor adapted to be powered by a battery;

a gear reduction assembly used to reduce the output speed of a shaft of the electric motor by a predetermined factor;

a ram drive system having a drive arm operatively coupled to the gear reduction assembly, and having a drive surface operatively coupled to the drive arm such that rotation of the drive arm causes linear movement of the drive surface; and a linkage assembly operatively associated with the drive surface, such that when the shaft of the electric motor rotates in one direction the drive surface causes the linkage assembly to move from a retracted position to an extended position and when the shaft of the electric motor rotates in an opposite direction of the one direction the drive surface causes the linkage assembly to move from the extended position to the retracted position.

11. The hand-held battery-powered in-line crimp tool according to claim 10, further comprising a ram operatively coupled to the linkage assembly such that when the linkage assembly moves from the retracted position to the extended position the ram moves linearly from an open position to a crimping position, and when the linkage assembly moves from the extended position to the retracted position the ram moves linearly from the crimping position to the open position.

12. The hand-held battery-powered in-line crimp tool according to claim 11, wherein the ram comprises at least one coupling bore at one end used to operatively coupled the ram to the linkage assembly, and at least one mounting bore at an opposite end of the ram used when coupling the ram to an impactor or die.

13. The hand-held battery-powered in-line crimp tool according to claim 10, wherein the ram drive system further comprises a wedge integral to or monolithically formed into a wedge support, wherein the drive surface forms a portion of the wedge and the wedge support is attached to the drive arm.

14. The hand-held battery-powered in-line crimp tool according to claim 10, wherein the linkage assembly comprises:

at least one first link having a first and a second mounting hole;

at least one second link having a third and a fourth mounting hole;

wherein the second link is coupled to the first link by positioning a pivot pin within the second mounting hole of the first link and the third mounting hole of the second link to form a drive engaging surface; and wherein the drive engaging surface is aligned with the drive surface such that linear motion of the drive surface causes the linkage assembly to move between a retracted position and an extended position.

15. The hand-held battery-powered in-line crimp tool according to claim 10, wherein the linkage assembly comprises:

a first link pair with each link in the link pair having first and second mounting holes;

a second link pair with each link in the link pair having third and fourth mounting holes; and a roller having a center bore positioned between the first and second link pairs;

wherein the second link pair is coupled to the first link pair by positioning a pivot pin within the second mounting holes of the first link pair and the third mounting holes of the second link pair, and wherein the roller is positioned between the first and second link pairs by positioning the pivot pin through the center bore of the roller; and wherein the roller is aligned with the drive surface such that linear motion of the drive surface causes the linkage assembly to move between a retracted position and an extended position.

16. The hand-held battery-powered in-line crimp tool according to claim 10, wherein the drive surface comprises a camming surface.

17. A hand-held battery-powered in-line crimp tool comprising:

a frame having a working head portion and a handle portion; and a drive system positioned at least partially within the handle portion of the frame, the drive system including:

an electric motor adapted to be powered by a battery;

a gear reduction assembly used to reduce the output speed of a shaft of the electric motor by a predetermined factor;

a ram drive system having a drive arm operatively coupled to the gear reduction assembly, a wedge support having a bore that receives at least a portion of the drive arm such that rotation of the drive arm causes linear movement of the wedge support, and a wedge having a drive surface; and a linkage assembly including:

a first link pair with each link in the link pair having first and second mounting holes;

a second link pair with each link in the link pair having third and fourth mounting holes; and a roller having a center bore positioned between the first and second link pairs;

wherein the second link pair is coupled to the first link pair by positioning a pivot pin within the second mounting holes of the first link pair and the third mounting holes of the second link pair, and wherein the roller is positioned between the first and second link pairs by positioning the pivot pin through the center bore of the roller; and wherein the roller is aligned with the drive surface of the wedge such that linear motion of the wedge support causes the linkage assembly to move between a retracted position and an extended position.

18. The hand-held battery-powered in-line crimp tool according to claim 17, further comprising a ram operatively coupled to the linkage assembly such that when the linkage assembly moves from the retracted position to the extended position the ram moves linearly from an open position to a crimping position, and when the linkage assembly moves from the extended position to the retracted position the ram moves linearly from the crimping position to the open position.

19. The hand-held battery-powered in-line crimp tool according to claim 18, wherein the ram comprises at least one coupling bore at one end used to operatively coupled the ram to the linkage assembly, and at least one mounting bore at an opposite end of the ram used when coupling the ram to an impactor or die.

20. The hand-held battery-powered in-line crimp tool according to claim 17, wherein the drive surface comprises a camming surface.

* * * * *